US005490233A

United States Patent [19]
Kovacevic

[11] Patent Number: 5,490,233
[45] Date of Patent: Feb. 6, 1996

[54] METHOD AND APPARATUS FOR REDUCING CORRELATED ERRORS IN SUBBAND CODING SYSTEMS WITH QUANTIZERS

[75] Inventor: Jelena Kovacevic, New York, N.Y.

[73] Assignee: AT&T IPM Corp., Coral Gables, Fla.

[21] Appl. No.: 321,375

[22] Filed: Oct. 11, 1994

Related U.S. Application Data

[63] Continuation of Ser. No. 984,080, Nov. 30, 1992, abandoned.

[51] Int. Cl.$^6$ .................................................. G10L 7/00
[52] U.S. Cl. ...................... 395/2.39; 395/2.36; 395/2.67; 382/190
[58] Field of Search .............................. 395/2, 2.36, 2.67, 395/2.75, 2.39; 382/10–19; 348/390–405

[56] References Cited

U.S. PATENT DOCUMENTS

| | | | |
|---|---|---|---|
| 4,048,443 | 9/1977 | Crochiere et al. | 381/37 |
| 4,972,484 | 11/1990 | Theile et al. | 395/2.36 |
| 5,214,502 | 5/1993 | Stone et al. | 348/472 |
| 5,223,926 | 6/1993 | Stone et al. | 348/396 |
| 5,231,487 | 7/1993 | Hurley et al. | 348/391 |

OTHER PUBLICATIONS

IIR Filterbank for Subband Coding of Images Ramstad, IEEE/Jun. 88.
Subband Image Coding with Optimal Intra– and Inter–Band Subband Quantization Kossentini et al., IEEE/Nov. 93.
Optimum Subband Filter Bank Design and Compensation in Presence of Quantizers Park et al., IEEE/Nov. 93.
Westerink et al., "Scalar Quantization Error Analysis for Image Subband Coding Using QMF's," IEEE Trans. on Signal Processing, Feb. 1972, pp. 421–428.
N. S. Jayant and P. Noll, "Digital Coding of Waveforms: Principles and Applications to Speech and Video," Prentice–Hall, Englewood Cliffs, N.J., Chapter, 4, pp. 115–220 and Chapter 11, pp. 486–509, 1984.

P. H. Westerink, J. Biemond and D. E. Boekee, "Scalar Quantization Error Analysis for Image Subband Coding Using QMF's, IEEE Trans. Signal Processing," vol. 40, pp. 421–428, Feb. 1992.
P. Chan and J. Lim, "One–Dimensional Processing for Adaptive Image Restoration," IEEE Trans. Acoust., Speech, and Signal Processing, vol. ASSP–33, pp. 117–125, Feb. 1985.
J. Kovacevic and M. Vetterli, "Non–separable multidimensional perfect reconstruction filter banks and wavelet bases for $R^n$," IEEE Trans. Inform. Th., Special issue on Wavelet Transforms and Multiresolution Signal Analysis, vol. 38, pp. 533–555, Mar. 1992.

(List continued on next page.)

Primary Examiner—Allen R. MacDonald
Assistant Examiner—Richemond Dorvil
Attorney, Agent, or Firm—Kenneth M. Brown

[57] ABSTRACT

A method and apparatus for reducing correlated errors in subband coding systems with quantizers is disclosed. A subband coding system comprises a plurality of subband analysis filters to divide the frequency spectrum of the input signal into subbands, individual subband quantizers for coding each subband by a preselected number of quantization levels, corresponding subband decoders and subband synthesis filters. The transfer function of each of the subband synthesis filters is advantageously determined based on the transfer functions of the subband analysis filters as well as on the characteristics of the quantizer used to code the corresponding subband. Specifically, the synthesis filter transfer functions may be based on a perfect reconstruction filter bank or a quadrature mirror filter bank, as well as on the gain factors of a gain plus additive noise linear model for the Lloyd-Max quantizers used to code the corresponding subbands. That portion of the error between the input signal and the replica signal as reconstructed by the system which is correlated to the input signal may be advantageously reduced or eliminated, irrespective of that portion of the error which is uncorrelated to the input signal. Thus, the total error in a final signal may be advantageously reduced by the subsequent application of prior art techniques for the reduction of random, uncorrelated noise.

23 Claims, 4 Drawing Sheets

OTHER PUBLICATIONS

H. S. Malvar, "Optimal Pre- and Post-Filtering in Noisy Sampled-Data Systems," Technical Report 519, Aug. 1986, Massachusetts Institute of Technology, Research Laboratory of Electronics, Cambridge, Mass.

A. Croisier et al., "Perfect channel splitting by use of interpolation/decimation/tree decomposition techniques," Int. Conf. on Inform. Sciences and Systems, (Patras, Greece), pp. 443-446, Aug. 1976.

F. Mintzer, "Filters for distortion-free two-band multirate filter banks," IEEE Trans. Acoust., Speech, and Signal Proc., vol. 33, pp. 626-630, Jun. 1985.

M. Vetteril, "A theory of mulitrate filter banks," IEEE Trans. Acoust., Speech, and Signal Proc., vol. 35, pp. 356-372, Mar. 1987.

P. P. Vaidyanathan, "Quandrature mirror filter banks, M-band extensions and perfect reconstruction techniques," IEEE ASSP Mag., vol. 4, pp. 4-20, Jul. 1987.

T. Kronander, "New criteria for optimazation of QMF banks to be used in an image coding system" Proc. IEEE Int. Symp. Circ. and Syst., (Portland), Oreg.), pp. 1354-1357, 1989.

T. Lookabaugh, et al., "Analysis/synthesis systems in the presence of quantization," Proc. IEEE Int. Symp. Circ. and Syst., (Portland, Oreg.), pp. 1341-1344, 1989.

A. Dembo and D. Malah, "Statistical design of analysis/synthesis systems," IEEE Trans. Acous., Speech, and Signal Proc., vol. 36, pp. 328-341, Mar. 1988.

P. P. Vaidyanathan, "Multirate digital filters, filter banks, polyphase networks, and applications: a tutorial," Proc. Ieee, vol. 78, pp. 56-93, Jan. 1990.

J. Johnston, "A filter family designed for use in Quardrature Mirror Filter Banks," Proc. IEEE Int. Conf. Acoust., Speech, and Signal Proc., (Denver, Colo.) pp. 291-294, 1980.

John W. Woods, "Subband Image Coding," Kluwer Academic Publishers, Boston/Dordrecht/London, Chapter 2, pp. 43-100, 1991.

N. Uzun et al., "Modeling and Analysis of Quantization Errors in Two Channel Subband Filter Structures," SPIE vol. 1818 Visual Communications and Image Processing '92, pp. 1446-1457 (Nov. 1992).

A. N. Akansu, *Multiresolution Signam Decomposition,* Academic Press, Inc. Harcourt Brace Jovanovich, Publishers, Boston, San Diego, New York, London, Sydney, Tokyo, Toronto, pp. 221-229 (Oct. 1992).

METHOD AND APPARATUS FOR REDUCING CORRELATED ERRORS IN SUBBAND CODING SYSTEMS WITH QUANTIZERS

This application is a continuation of application Ser. No. 07/984080, filed on Nov. 30, 1992 now abandoned.

FIELD OF THE INVENTION

The present invention relates generally to digital waveform coding systems and more specifically to subband coding systems incorporating quantizers.

BACKGROUND OF THE INVENTION

In a system for the communication and/or storage of signals representing, for example, speech, image or video information, the signals to be transmitted or stored are often coded or compressed to reduce the amount of data required to represent them. One technique useful for achieving such signal compression while maintaining signal quality of the subsequently decoded signal is subband coding. In subband coding the frequency spectrum of the signal to be coded is divided into a plurality of subbands by a bank of bandpass filters (the analysis filter bank). Each subband is, in effect, translated to zero frequency by modulation techniques, and then sampled (or resampled) at its Nyquist rate (twice the width of the band). Each individual subband signal is then digitally encoded, typically by a quantizer with a preselected number of quantization levels.

On reconstruction, the encoded subband signals are decoded and translated back to their original locations in the spectrum. These reconstructed subband signals are then combined using synthesis filters to give a close replica of the original signal. With this technique, each subband can be encoded according to criteria (including perceptual criteria) that are specific to that band. In particular, the number of bits per sample (dependent on the number of quantizer levels) in each band can be individually allocated, thereby separately controlling the reconstruction error variance in each band. In this way, the inherent tradeoff between bits per sample and reconstructed signal quality can be optimized based on the characteristics of the type of input signal. For example, in the case of speech signals, a relatively larger number of bits per sample are typically used in the low to medium frequency bands, where pitch and formant structure are advantageously preserved for faithful reproduction of the signal.

The principals of subband coding techniques are described generally in N. S. Jayant and P. Noll, *Digital Coding of Waveforms: Principles and Applications to Speech and Video*, ch. 11, Prentice-Hall, Englewood Cliffs N.J., 1984, and in *Subband Image Coding* (J. W. Woods, ed.), ch. 2, Kluwer Academic Publishers, Boston Mass., 1991, each of which is hereby incorporated by reference. In addition, aspects of the use of subband coding techniques to reduce bitrates for digital speech communication are described in detail in U.S. Pat. No. 4,048,443, issued on Sep. 13, 1977, to R. E. Crochiere et al., and assigned to the assignee of the present invention. The Crochiere patent is also hereby incorporated by reference. The application of subband coding techniques to still images and to video signals are described, e.g., in *Subband Image Coding*.

Much of the work on subband coding techniques has been directed to reconstructing the original signal from individual subband signals. Specifically, such work has emphasized recreating as closely as possible the original (unquantized) input signal, while ignoring any loss of information due to coding (quantization) effects. It is well known that the bandpass filters used in the analysis filter bank can never have perfectly sharp cut-offs (as do "brick wall" filters). Thus, one effect of dividing the original signal into subbands and subsequently recombining the subbands is to produce errors relating from signals from other subbands. The effect of these errors should be reduced or eliminated by the synthesis filters used to process the subband signals.

Early efforts in this direction addressed the aliasing effects which occur when overlapping subbands are sampled at a frequency less than twice the entire width of the band (including all of the corresponding analysis filter's roll-off). One result of these efforts was the Quadrature Mirror Filter (QMF) technique, described, e.g., in Jayant and Noll, ch. 11. Using QMF techniques, aliasing effects resulting from the reconstruction of the original signal from its overlapping subbands may be entirely eliminated by synthesis filters having transfer functions based on the transfer functions of the analysis filters. In other efforts, so-called perfect reconstruction filter sets have been developed in which the original (unquantized) input signal can be replicated perfectly in the absence of coding errors based on appropriate synthesis filters. Again, this is accomplished by using synthesis filters having transfer functions based on the transfer functions of the analysis filters.

Given this state of the art, a typical approach used by designers of subband coding systems is to use a perfect reconstruction (or alias-cancellation QMF) filter bank and then to select subband quantizers. However, the selection of the quantizers has not been an integral part of the design of the filter banks. As used in this discussion, overall (total) reconstruction error is determined as the difference between the input signal applied to the analysis filter bank and the resultant output (replica) signal produced by combining the outputs of the synthesis filters. Since the quantization error cannot be eliminated by the design of the filters (a quantization by its nature results in a loss of information), prior subband coding systems have sought to achieve minimum overall reconstruction error using perfect reconstruction filter banks and separately optimized (minimal loss) quantizers. Moreover, such optimal, minimum error quantizers, so-called Lloyd-Max quantizers, are well known in the art.

SUMMARY OF THE INVENTION

The limitations of the prior art techniques are overcome and a technical advance is made in accordance with the present invention based, in part, on a recognition that it is advantageous in subband coders with quantizers to reduce that part of the reconstruction error which is correlated with the input signal, even at the expense of increasing uncorrelated (random) error. It has been found that if most or all of the correlated error is eliminated it becomes possible to ultimately achieve a reconstructed signal with less total error than the aforementioned prior approach. This is so because well-known random noise removal techniques may be advantageously applied to the output of the subband coding system to reduce uncorrelated error. Thus, even though a subband coding system in accordance with one aspect of the present invention may produce a resultant reconstructed signal with more total error than a prior system, it will nonetheless be preferred because its error is exclusively or primarily uncorrelated with the input signal. Typical error from optimal quantization methods (such as Lloyd-Max quantization) includes both correlated and uncorrelated error. Therefore, an illustrative embodiment of the present invention advantageously incorporates characteristics of the quantizers in the design of synthesis filters. Thus, in accordance with an illustrative embodiment of the present invention, a technique is provided for reducing correlated errors in subband coding systems with quantizers. In accordance with one aspect of this embodiment, a subband synthesis filter for processing signals in one subband has a transfer function based on both the transfer function of the subband analysis filter bank and on the characteristics of the corresponding quantizer used to code that subband.

In accordance with another aspect of an illustrative embodiment of the present invention, a plurality of subband synthesis filters each has a transfer function based on both the transfer function of the subband analysis filter bank and on the characteristics of the quantizer used to code the corresponding subband. The outputs of these subband synthesis filters are then combined to produce a replica signal representative of the input signal.

In accordance with a further aspect of an illustrative embodiment, subband synthesis filters for each subband have transfer functions which reduce error in the replica signal that is correlated with the input signal.

In accordance with another aspect of an illustrative embodiment, each subband synthesis filter has a transfer function G given by $G=(1/\alpha)T$. Here, T is the transfer function of a perfect reconstruction filter section for the corresponding subband based on the subband analysis filter bank, and $\alpha$ is a gain factor relating to the gain plus additive noise model of the Lloyd-Max quantizer for the corresponding subband.

In accordance with yet another aspect of an illustrative embodiment, each subband synthesis filter has a transfer function G given by $G=(1/\alpha)T$. Here, T is the transfer function of a quadrature mirror filter section for the corresponding subband based on the subband analysis filter bank, and $\alpha$ is a gain factor relating to the gain plus additive noise model of the Lloyd-Max quantizer for the corresponding subband.

In accordance with a further aspect of an illustrative embodiment, a method and apparatus for decoding a subband coded input signal filters each coded subband signal with a corresponding subband synthesis filter. Each subband synthesis filter has a transfer function based on the transfer function of the subband analysis filter bank and on the characteristics of the corresponding quantizer used to code that subband.

In accordance with yet a further aspect of an illustrative embodiment, a method and apparatus for decoding a subband coded input signal reduces the error in the resultant decoded signal which is correlated with the original input signal.

In accordance with another aspect of an illustrative embodiment, a method and apparatus for decoding a subband coded input signal reduces the total error in the resultant decoded signal. First, the error which is correlated with the original input signal is reduced. Then, a noise removal technique is applied to reduce the uncorrelated error as well.

DETAILED DESCRIPTION

Introduction

For clarity of explanation, the illustrative embodiment of the present invention is presented as comprising individual functional blocks. The functions represented by these blocks may be provided through the use of either shared or dedicated hardware, including, but not limited to, hardware processors capable of executing software. Illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be advantageous in some circumstances.

Figure 1:
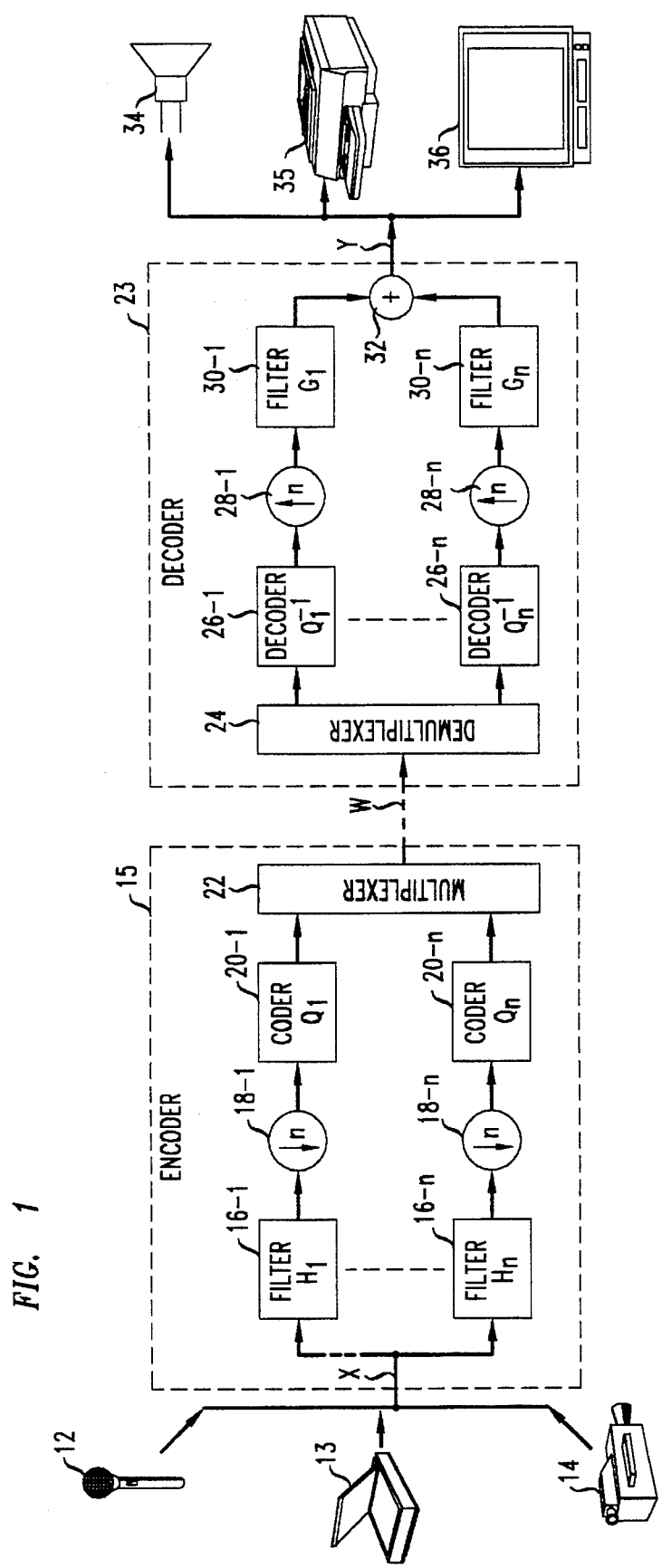
FIG. 1 shows a prior art subband coding system.

FIG. 1 shows a prior art subband coding system, familiar to those of ordinary skill in the art, illustrated for image or speech coding. The system comprises encoder 15, decoder 23 and appropriate input and output devices. In the case of speech, microphone 12 may be used to input speech signal X to encoder 15, and speaker 34 may be used to project reconstructed (output) speech signal Y provided by decoder 23. In the case of still images, scanner 13 may be used to input image signal X to encoder 15, and printer 35 may be used to print out reconstructed (output) image signal Y provided by decoder 23. In the case of video, camera 14 may be used to input video signal X to encoder 15, and display 36 may be used to display reconstructed (output) image signal Y provided by decoder 23. Not shown explicitly are analog to digital converters and corresponding digital to analog converters to convert from and to signals for input or output devices which supply or require analog signals. Such converters will be used in appropriate cases as will be clear to those skilled in the art. In each case, encoder 15 comprises analysis filters 16-1 to 16-n, downsamplers 18-1 to 18-n, subband coders 20-1 to 20-n and multiplexer 22. Decoder 23 comprises demultiplexer 24, subband decoders 26-1 to 26-n, upsamplers 28-1 to 28-n, synthesis filters 30-1 to 30-n and combiner 32.

Specifically, encoder 15 codes input signal X to produce a coded input signal W for storage or transmission. Analysis filters 16-1 to 16-n and corresponding downsamplers 18-1 to 18-n make up the analysis filter bank of the subband coding system. This filter bank splits the input signal into n subband channels, translating each to zero frequency by a modulation process. Moreover, each subband is downsampled by a factor of n. Downsampling by a factor m comprises the process of selecting every m'th sample. Although it is possible to perform subband coding with downsampling by a factor m<n, where n is the number of channels, it is most efficient and most common that m=n. This is known as a critically sampled filter bank.

Next, subband coders 20-1 to 20-n individually code each subband signal by quantization functions $Q_1$ to $Q_n$ respectively. Each of these quantization functions quantizes the sampled value of the subband signal into one of a predetermined number of discrete quantization levels. Note that each coder may advantageously quantize its corresponding subband signal into a different number of levels, as described above. In addition to the quantization, coders 20-1 to 20-n transform the quantized values into an encoded representation. The final step performed by encoder 15 is the combination of each coded subband signal into a single coded input signal W by multiplexer 22. This coded input signal may then be stored for later retrieval and decoding or transmitted across a communication channel for decoding at a receiving end. Alternatively, the individual coded subband signals may be stored or transmitted separately. In this latter case, neither multiplexer 22 of encoder 15 nor demultiplexer 24 of decoder 23 is included, and coded input signal W represents a plurality of separate signals.

Additional coding or other processing for transmission or storage may be used in particular applications. Thus, for example, when encoder 15 and decoder 23 are used in a telecommunications context, additional switching and channel coding may be used to connect a subscriber at a first location with another subscriber at a second location via any of a variety of communications channels.

Decoder 23 decodes the coded input signal W to produce replica signal Y, which is representative of input signal X. Demultiplexer 24 separates the combined coded input signal back into individual coded subband signals, which are, in turn decoded by subband decoders 26-1 to 26-n. Specifically, each subband decoder performs the inverse function of the corresponding subband coder in encoder 15. For example, subband decoder 26-1 performs function $Q_1^{-1}$ and subband decoder 26-n performs function $Q_n^{-1}$, where $Q_1^{-1}$ extracts the quantized values from the encoded representation. Of course, the information lost by the quantization process in encoder 15 cannot be restored, since the functions $Q_1$ to $Q_n$ are many-to-one functions. The decoded subband signals are then upsampled by a factor of n by upsamplers 28-1 to 26-n (corresponding to the downsampling performed by downsamplers 18-1 to 18-n in encoder 15).

Next, the decoded subband signals pass through synthesis filters 30-1 to 30-n (the synthesis filter bank). Each subband signal is modulated back to its original spectral location before finally being combined by combiner 32 to produce replica signal Y. Moreover, it is the task of synthesis filters 30-1 to 30-n to address the reconstruction problems described above. In particular, an appropriate choice of a combination of an analysis filter bank and a synthesis filter bank can eliminate aliasing errors (e.g.; a QMF design) or guarantee perfect reconstruction of the original signal (in the absence of coding errors).

QMF and Perfect Reconstruction Filter Banks

Without loss of generality, the subband coding system of FIG. 1 can employ a value of n=2. The output of the system in the absence of quantization (i.e., assume coding functions $Q_1$ to $Q_n$ are identity functions) is $$Y(z)=(½)[G_1(z)H_1(z)+G_2(z)H_2(z)]X(z)+(½)[G_1(z)H_1(-z)+G_2(z)H_2(-z)]X(-z) \quad (1)$$

The component $X(-z)$ is the aliased version of the signal; alias cancellation systems are designed to remove this part of the signal. For example, the quadrature mirror filter (QMF) technique uses the following choice of filters:

$$H_1(z)=G_1(z)=H(z), H_2(z)=-G_2(z)=H(-z). \quad (2)$$

As is known in the prior art, once the filters are chosen as in (2), it is not possible to obtain perfect reconstruction of the signal, i.e., $Y(z)=X(z)$ (except for trivial two-tap filters in the FIR, or finite-input-response, case). Note, however, that by numerically approximating perfect reconstruction, filters of extremely high quality can be designed.

To achieve both alias cancellation and perfect reconstruction, it is clear from equation (1) that the filters must satisfy the following two equations:

$$G_1(z)H_1(z)+G_2(z)H_2(z)=2, \quad (3)$$

and $$G_1(z)H_1(-z)+G_2(z)H_2(-z)=0. \quad (4)$$

Note, however, that such filters would achieve perfect reconstruction only in the absence of quantization. Thus, it is an object of the present invention to incorporate the quantization process in the design of the filter banks.

Gain Plus Additive Noise Model for Lloyd-Max Quantization

A well known optimal quantizer is the Lloyd-Max quantizer, described, e.g., in Jayant and Noll, ch. 4, which is hereby incorporated by reference. For Lloyd-Max quantizers, it can be shown that $$\sigma_y^2=\sigma_x^2-\sigma_q^2, \quad (5)$$

where $\sigma_q^2$, $\sigma_x^2$ and $\sigma_y^2$ are the variances of the quantization error, the quantizer input signal and the quantizer output signal, respectively. This quantizer is optimal in that it yields the minimum mean-squared error $\sigma_q^2$. It is also well known in the art that the Lloyd-Max quantizer can be modeled by a "gain plus additive noise" linear model. That is, its input/output relationship may be given by $$y=\alpha x+r, \quad (6)$$

where x and y are random variables representing the input and output of the quantizer, respectively, r is a random variable representing the additive noise, and $\alpha$ is the gain factor ($\alpha \leq 1$).

Figure 2:
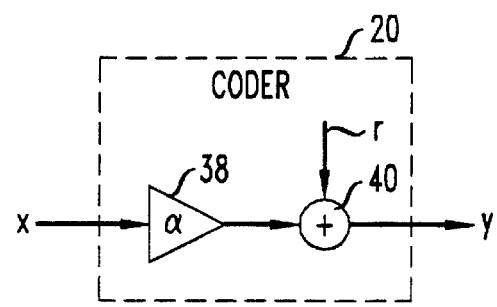
FIG. 2 shows a gain-plus-additive-noise linear model for the Lloyd-Max quantizer.

The gain plus additive noise model for the Lloyd-Max quantizer is shown diagrammatically in FIG. 2 as an instantiation of one subband coder 20 from the system of FIG. 1. In particular, amplifier 38 applies a gain $\alpha$, where $\alpha \leq 1$, to quantizer input (random) variable x. Then adder 40 adds in random variable r, the noise term, to produce quantizer output (random) variable y.

Figure 3:
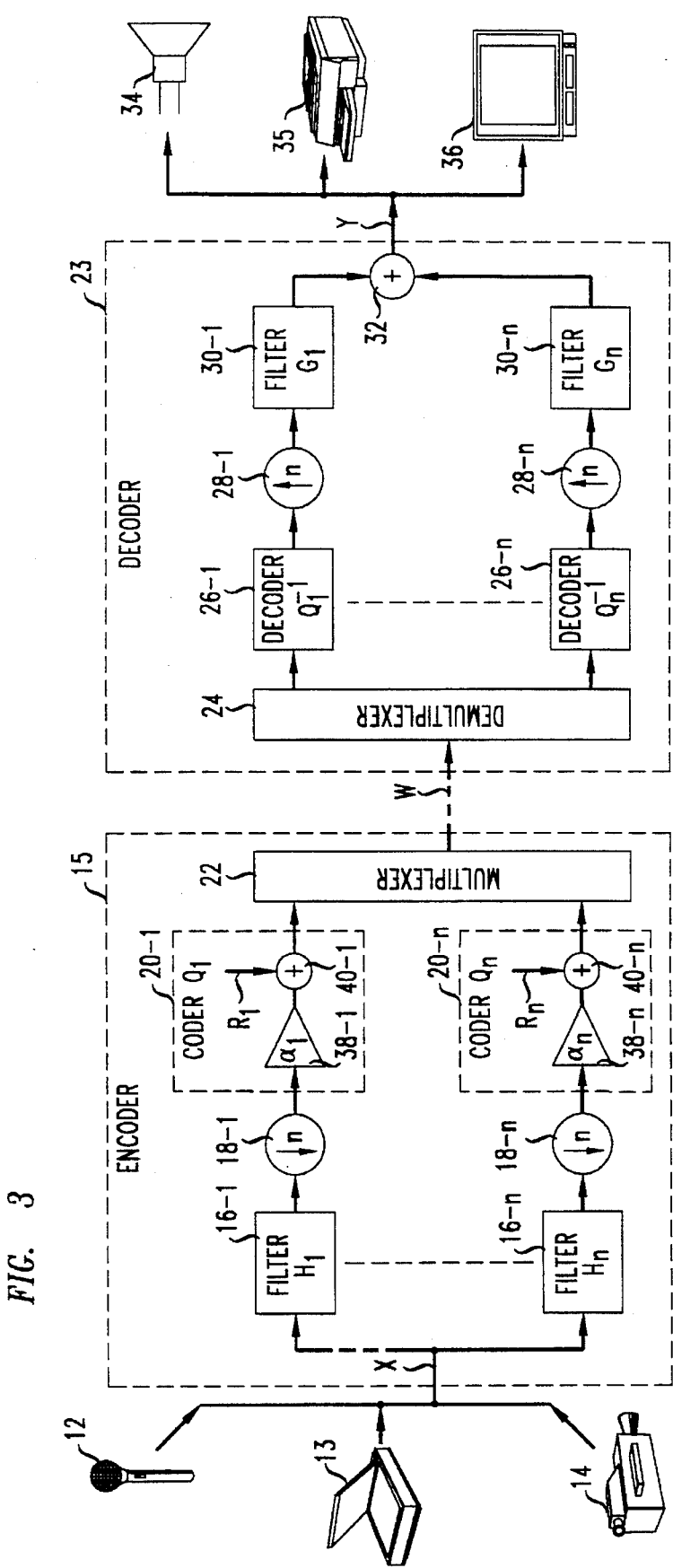
FIG. 3 shows the subband coding system of FIG. 1 with the gain plus additive noise linear model for the Lloyd-Max quantizer incorporated therein.

FIG. 3 shows the subband coding system of FIG. 1 with an illustration of the gain plus additive noise model for the Lloyd-Max quantizers incorporated therein. In particular, coder 20-1 comprises amplifier 38-1, which applies gain $\alpha_1$, $\alpha_1 \leq 1$, and adder 40-1, which adds in random noise signal $R_1$. Similarly, coder 20-n is shown comprising amplifier 38-n, which applies gain $\alpha_n$, $\alpha_n \leq 1$, and adder 40-n, which adds in random noise signal $R_n$.

As is well known in the art, the gain factor $\alpha$ may be specifically chosen so that the additive noise component will be uncorrelated to the input signal. In fact, this is an important feature of the quantizer and associated model. In particular, for zero mean, unity-variance input signals, it is advantageous to choose $$\alpha=1-(\sigma_q^2/\sigma_x^2). \quad (7)$$

Note that for input signals which are not zero mean, unity-variance signals, it can be readily determined that it is only necessary to normalize the quantizer input and output (random) variables x and y. In this manner, $\alpha$ is derived based on the mean and standard deviation of the input signal. In particular, choose $$\alpha=1-(E(q^2)/E(x^2)), \quad (8)$$

where $E(q^2)$ and $E(x^2)$ are the second moments of q and x, respectively. The gain plus additive noise model for the Lloyd-Max quantizer is described, e.g., in Jayant and Noll, ch. 4.

Component Error Analysis

It is well known in the art to separate the error of a subband coding system into components in order to investigate the influence and severity of each. For example, an analysis of the error components in a subband coding system using QMF's is described in P. H. Westerink, J. Biemond and D. E. Boekee, "Scaler Quantization Error Analysis for Image Subband Coding Using QMF's," *IEEE Trans. Signal Processing*, vol. 40, pp. 421–428, February 1992, which is hereby incorporated by reference.

Without loss of generality, the subband coding system of FIG. 3 may employ n=2 in which coders 20-1 and 20-2 are Lloyd-Max quantizers with quantization functions $Q_1$ and $Q_2$, respectively. Furthermore, the gain plus additive noise linear models for $Q_1$ and $Q_2$ may be assumed to yield gains of $\alpha_1$ and $\alpha_2$, respectively, and additive noise components of $R_1(z)$ and $R_2(z)$, respectively, as shown. Then, the output of the subband coding system (including quantization) is $$Y(z) = (1/2)[\alpha_1 G_1(z)H_1(z) + \alpha_2 G_2(z)H_2(z)]X(z) + \quad (9)$$
$$(1/2)[\alpha_1 G_1(z)H_1(-z) + \alpha_2 G_2(z)H_2(-z)]X(-z) +$$
$$G_1(z)R_1(z^2) + G_2(z)R_2(z^2).$$

Therefore, the total error (difference between the input signal X and the output signal Y) is $$E(z) = Y(z) - X(z) \quad (10)$$
$$= (1/2)[\alpha_1 G_1(z)H_1(z) + \alpha_2 G_2(z)H_2(z) - 2]X(z) +$$
$$(1/2)[\alpha_1 G_1(z)H_1(-z) + \alpha_2 G_2(z)H_2(-z)]X(-z) +$$
$$G_1(z)R_1(z^2) + G_2(z)R_2(z^2).$$

This error can be decomposed into three constituent parts. The signal error $E_S(z)$ is the term with $X(z)$, namely $$E_S(z) = (\tfrac{1}{2})[\alpha_1 G_1(z)H_1(z) + \alpha_2 G_2(z)H_2(z) - 2]X(z), \quad (11)$$

the aliasing error $E_A(z)$ is the term with $X(-z)$, namely $$E_A(z) = (\tfrac{1}{2})[\alpha_1 G_1(z)H_1(-z) + \alpha_2 G_2(z)H_2(-z)]X(-z), \quad (12)$$

and the random error $E_R(z)$ is $$E_R(z) = G_1(z)R_1(z^2) + G_2(z)R_2(z^2). \quad (13)$$

Thus, the total error $E(z)$ can be represented as $$E(z) = E_S(z) + E_A(z) + E_R(z). \quad (14)$$

Changing Synthesis According to Quantization

According to an illustrative embodiment of the present invention, the synthesis filters to be used in a subband coding system are advantageously based not only on the analysis filters used, but also on the characteristics of the quantizers. Consider, for example, the subband coding system of FIG. 3 with n=2 as analyzed above. Analysis filters 16-1 and 16-2 are chosen to have respective transfer functions $H_1$ and $H_2$. Synthesis filters 30-1 and 30-2, with respective transfer functions $T_1$ and $T_2$, are chosen to form, in combination with analysis filters 16-1 and 16-2, a perfect reconstruction system in the absence of quantization. It is well known in the art that such transfer functions $T_1$ and $T_2$ can always be determined given transfer functions $H_1$ and $H_2$. As described above, prior art subband coding design techniques would commonly choose synthesis filters having transfer functions $T_1$ and $T_2$, and then choose optimal quantizers with the desired number of quantization levels for each subband.

According to an illustrative embodiment of the present invention, however, different synthesis filters will be used. In particular, the synthesis filters in accordance with this embodiment of the present invention have transfer functions which are based not only on $T_1$ and $T_2$, respectively, but based on the corresponding quantizers as well. Note first that the transfer functions $H_1$ and $H_2$ together with the transfer functions $T_1$ and $T_2$ must satisfy the conditions specified in equations (3) and (4) above, since they form a perfect reconstruction filter set. Specifically, then, $$T_1(z)H_1(z) + T_2(z)H_2(z) = 2, \quad (15)$$

and $$T_1(z)H_1(-z) + T_2(z)H_2(-z) = 0. \quad (16)$$

Figure 4:
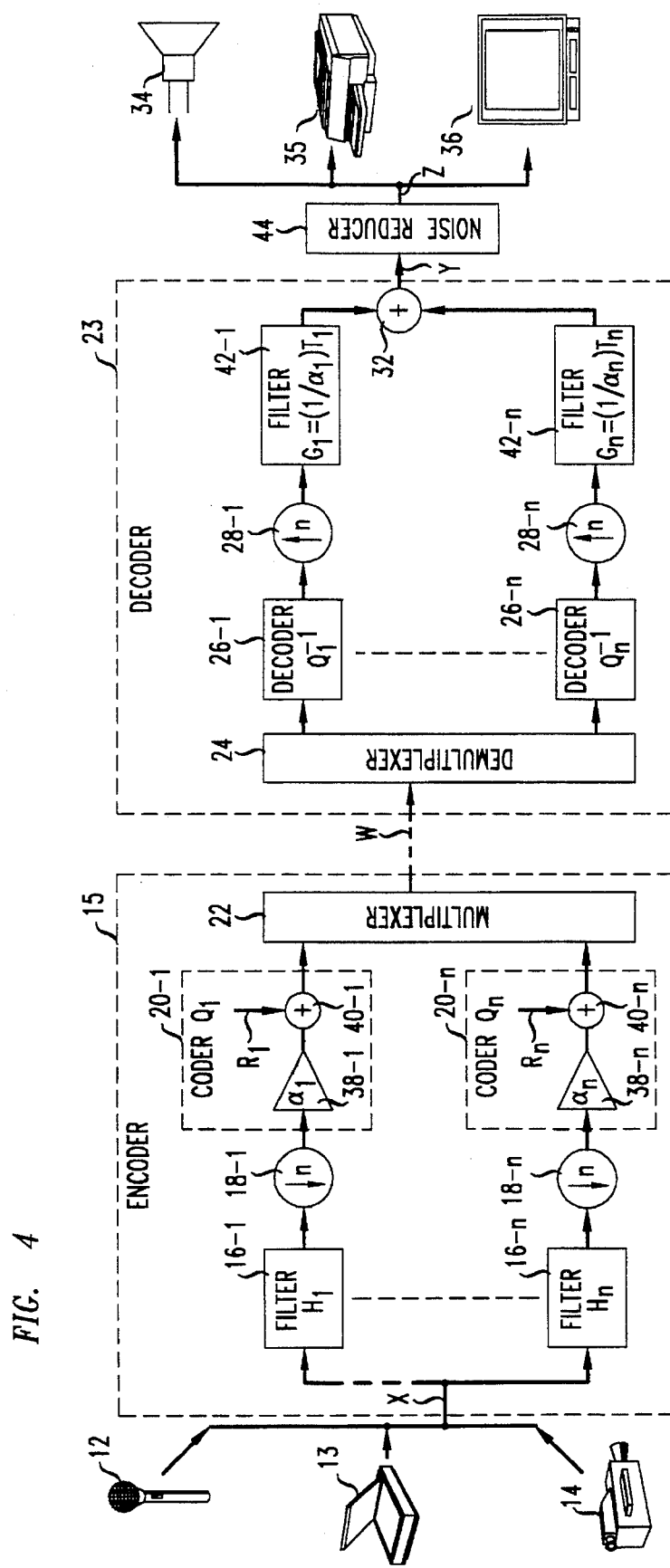
FIG. 4 shows the subband coding system of FIG. 3 as modified in accordance with an illustrative embodiment of the present invention.

FIG. 4 shows the subband coding system of FIG. 3 modified according to an illustrative embodiment of the present invention. In particular, synthesis filters 42-1 and 42-2 are chosen to have transfer functions $G_1$ and $G_2$, respectively, so that $$G_1(z) = (1/\alpha_1)T_1(z), \quad (17)$$

and $$G_2(z) = (1/\alpha_2)T_2(z), \quad (18)$$

where $\alpha_1$ and $\alpha_2$ are, once again, the respective gains of the gain plus additive noise linear model for quantization functions $Q_1$ and $Q_2$, as implemented by coders 20-1 and 20-2, respectively.

Substituting equations (17) and (18) into equations (11), (12) and (13), and then applying equations (15) and (16), gives signal error $E_S(z)$ as $$E_S(z) = (\tfrac{1}{2})[T_1(z)H_1(z) + T_2(z)H_2(z) - 2]X(z) = 0, \quad (19)$$

aliasing error $E_A(z)$ as $$E_A(z) = (\tfrac{1}{2})[T_1(z)H_1(-z) + T_2(z)H_2(-z)]X(-z) = 0, \quad (20)$$

and random error $E_R(z)$ as $$E_R(z) = (1/\alpha_1)T_1(z)R_1(z^2) + (1/\alpha_2)T_2(z)R_2(z^2). \quad (21)$$

Therefore, by choosing synthesis filters having transfer functions according to equations (17) and (18), all signal-dependant error has been eliminated. Only signal-independent error $E_R(z)$ remains. Therefore, known (random) noise removal techniques may be advantageously applied in order to reduce $E_R(z)$. Note, however, that the random error component of the total error has, in fact, been increased as compared to prior art techniques. This is the result of dividing the terms in equation (21) by $\alpha_1$, where $\alpha_1 \leq 1$, as compared with the terms of equation (13). Moreover, note that the total error, namely, $E_S(z) + E_A(z) + E_R(z)$, may or may not be reduced from that of prior art techniques, depending on the relative magnitude of $\alpha_1$ and $\alpha_2$ as compared with that of $E_S(z)$ and $E_A(z)$ in equations (11) and (12). Nonetheless, the total error remaining after noise removal will advantageously be reduced by the application of a standard random noise removal technique. One such technique is typically applied in an image processing context as described, for example, in P. Chan and J. Lim, "One-Dimensional Processing for Adaptive Image Restoration," *IEEE Trans. Acoust., Speech, and Signal Processing*, vol. ASSP-33, pp. 117–125, February 1985, which is hereby incorporated by reference.

Referring to FIG. 4, random noise reducer 44 accepts replica signal Y (representative of input signal X), processes it according to a prior art noise reduction technique such as the cited Chan and Lim process to produce improved replica signal Z. The signal Z is then provided to output devices such as speaker 34 (in the case of speech), printer 35 (in the case of still images) or display 36 (in the case of video).

Generalizing to the n subband case, synthesis filters 42-1 to 42-n are chosen to have transfer functions $G_1$ to $G_n$, respectively, such that $$G_i(z)=(1/\alpha_i)T_i(z), \quad (22)$$

for i=1 to n. Again, $T_1$ to $T_n$ are the transfer functions for respective perfect reconstruction synthesis filters 30-1 to 30-n for the system of FIG. 3. $\alpha_1$ to $\alpha_n$ are the respective gain factors for the Lloyd-Max quantization functions $Q_1$ to $Q_n$, as implemented by coders 20-1 to 20-n, respectively. With all signal-dependent error eliminated, the only remaining (random) error is $$E_R(z)=(1/\alpha_1)T_1(z)R_1(z^2)+\ldots+(1/\alpha_n)T_n(z)R_n(z^2). \quad (23)$$

Figure 5:
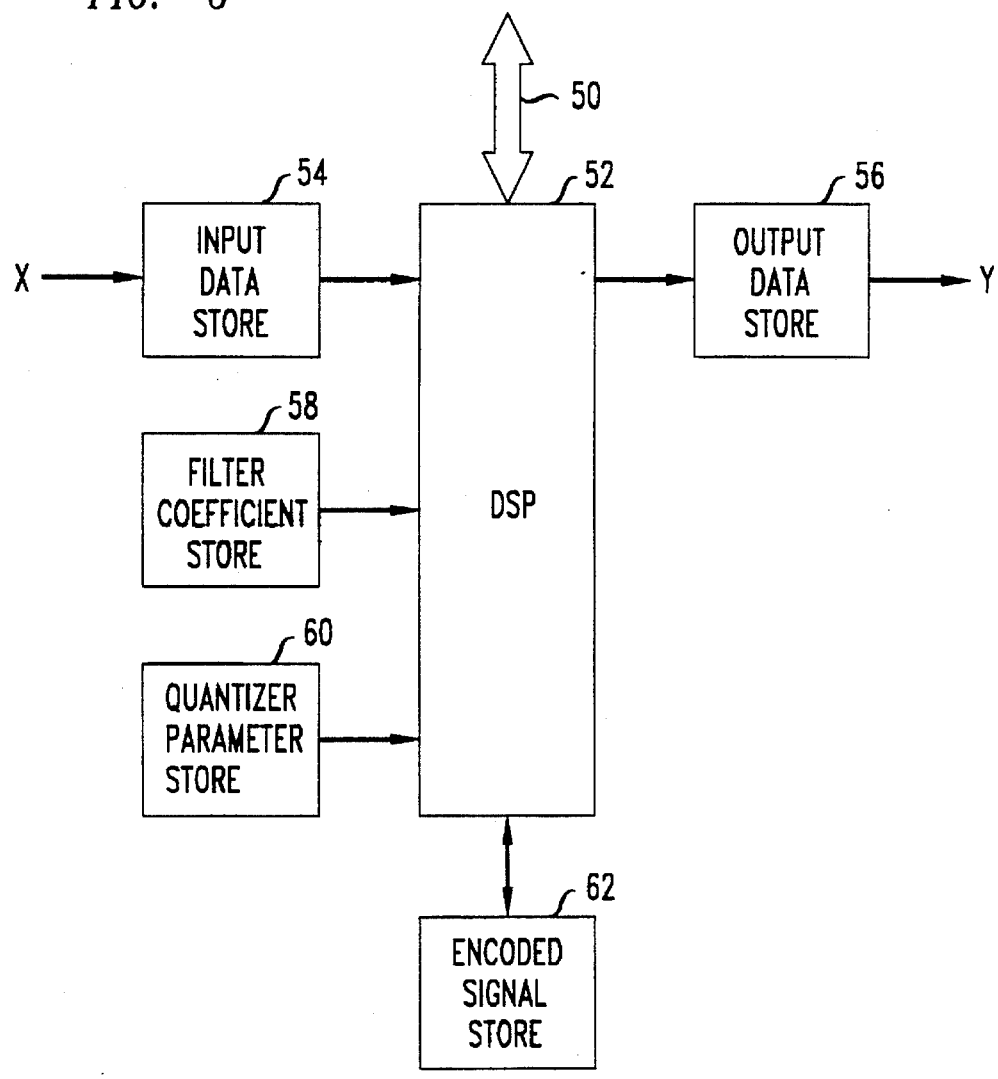
FIG. 5 shows an implementation of the subband coding system of FIG. 4 according to an illustrative embodiment thereof.

FIG. 5 shows an illustrative embodiment of a digital signal processor implementation of the subband coding system of the present invention. In particular, the illustrated system comprises digital signal processor (DSP) 52, bidirectional transmission line 50, input data store 54, output data store 56, filter coefficient store 58, quantizer parameter store 60 and encoded signal store 62. In appropriate cases, the various storage elements 54, 56, 58, 60 and 62 will be combined in one or a few data storage elements under the control of well known memory management apparatus or programs internal or external to DSP 52. The illustrated system may be used to encode an input signal X supplied to DSP 52 by input data store 54. The encoded signal may then be stored in encoded signal store 62 for later retrieval or may be communicated to another system via bidirectional transmission line 50. The system may also be used to produce a replica signal Y from an encoded input signal, which may be retrieved from encoded signal store 62 or received from another system through bidirectional transmission line 50. The replica signal is stored by DSP 52 in output data store 56. The analysis filter transfer functions and the synthesis filter transfer functions are implemented as described above in DSP 52 based on the filter coefficients provided by filter coefficient store 58. The quantization functions are implemented as described above based on quantization parameters provided by quantizer parameter store 60. That is, each of the sampling, filtering, quantizing, and translating operations are individually well known in the art. Similarly, the derivation of quantizing parameters, transfer function formulation and other described signal processing functionality are individually well known in the art. The present disclosure teaches how these techniques can be modified to produce the advantageous results of the present invention.

Multidimensional Case Generalization

The preceding description of an illustrative embodiment of the present invention processes unidimensional input signals such as speech. The invention is not so limited. That is, the technique is readily applied to multidimensional input signals such as still images (two dimensions) or video signals (three dimensions). Specifically, given an m-dimensional input signal, one chooses the synthesis filters to have transfer functions $G_i(z)$, such that $$G_i(z)=(1/\alpha_i)T_i(z), \quad (24)$$

where z is the m-dimensional z-transform vector, to eliminate all signal-dependent errors. Furthermore, the remaining, random, error will be $$E_R(z)=(1/\alpha_1)T_1(z)R_1(z^D)+\ldots+(1/\alpha_n)T_n(z)R_n(z^D), \quad (25)$$

where D is the sampling matrix representing the sampling lattice, and $z^D$ denotes multidimensional upsampling. Multidimensional subband coding techniques involved in these operations are well known in the art, as described, e.g., in J. Kovacevic and M. Vetterli, "Non-separable multidimensional perfect reconstruction filter banks and wavelet bases for $R^n$," *IEEE Trans. Inform. Th.*, special issue on Wavelet Transforms and Multiresolution Signal Analysis, vol. 38, pp. 533–555, March 1992, which is hereby incorporated by reference.

Use With QMF Filter Banks

The techniques used in the preceding illustrative embodiments of the present invention can also be advantageously applied to systems using QMF filter banks, rather than perfect reconstruction filter banks. In particular, again consider the subband coding system of FIG. 3 with n=2. Now, however, it is to be assumed that analysis filters 16-1 and 16-2 and synthesis filters 30-1 and 30-2 have transfer functions such that the filter banks in combination form a quadrature mirror filter (QMF) system, rather than a perfect reconstruction system. Specifically, according to equation (2), let analysis filters 16-1 and 16-2 have transfer functions H(z) and H(−z), respectively, and let transfer functions $T_1$ and $T_2$ be H(z) and −H(−z), respectively. Then, according to another illustrative embodiment of the present invention, let synthesis filters 42-1 and 42-2 of the improved subband coding system of FIG. 4 have transfer functions $G_1$ and $G_2$, respectively, so that $$G_1(z)=(1/\alpha_1)T_1(z)=(1/\alpha_1)H(z), \quad (26)$$

and $$G_2(z)=(1/\alpha_2)T_2(z)=-(1/\alpha_2)H(-z), \quad (27)$$

where $\alpha_1$ and $\alpha_2$ are, once again, the respective gains of the gain plus additive noise linear model for quantization functions $Q_1$ and $Q_2$, as implemented by coders 20-1 and 20-2, respectively.

In this case, letting $H_1(z)=H(z)$, $H_2(z)=H(-z)$, and substituting equations (26) and (27) into equation (9), the resulting output of the system becomes $$Y(z)=(\tfrac{1}{2})[H^2(z)-H^2(-z)]X(z)+(1/\alpha_1)H(z)R_1(z^2)-(1/\alpha_2)H(-z)R_2(z^2). \quad (28)$$

Note that the aliasing term including X(−z) from equation (9) goes to zero in equation (28). The error between the output of the system and the input signal now becomes $$E(z)=(\tfrac{1}{2})[H^2(z)-H^2(-z)-2]X(z)+(1/\alpha_1)H(z)R_1(z^2)-(1/\alpha_2)H(-z)R_2(z^2). \quad (29)$$

The error consists of only two terms. The first term including X(z) represents the QMF error (lack of perfect reconstruction error), and the second term is random error uncorrelated with the input signal. However, it is known in the art that the QMF error is typically almost negligible. Therefore, the technique of this illustrative embodiment of the present invention, even when based on QMF filter banks rather than perfect reconstruction filter banks, results in a subband coding system with almost entirely uncorrelated error. Thus, the aforementioned random noise reduction techniques may also be advantageously applied to a QMF-based system, resulting in an improvement over prior art subband coding systems.

Although a number of specific embodiments of this invention have been shown and described herein, it is to be understood that these embodiments are merely illustrative of the many possible specific arrangements which can be devised to represent application of the principles of the present invention. Numerous and varied other arrangements can be devised in accordance with these principles by those of ordinary skill in the art without departing from the spirit and scope of the invention.

Those skilled in the art will recognize that the techniques described may be applied to coding and decoding of signals of various kinds in a wide range of applications. As an illustration, the above-described techniques will advantageously find application in telecommunications applications in combination with well known transmission, switching and terminal equipment. While audio, image and video signals have been illustratively discussed above, it should be understood that processing of other signals from applications such as medical technology and seismology will, in appropriate cases be enhanced using the techniques of the present invention. Likewise, though perfect reconstruction and QMF filter systems have illustratively been described above, other particular systems and applications using them will benefit from the application of the present techniques. Further, though Lloyd-Max quantizers have illustratively been employed to illustrate the use of systems including quantization in combination with subband filters, it should be understood that the teachings of the present invention contemplate the use of other particular quantizers having characteristics which can be advantageously reflected in decoder filters of the overall system.

While the above description has proceeded in terms of a particular linear transformation technique, i.e., subband coding, it should be understood that other linear transformation techniques may be used in an equivalent manner. As an example of such linear transformation, the well known Discrete Cosine Transform coding (DCT) technique may be used in a manner consistent with the above teachings. Thus, signals processed by a DCT transform analysis followed by a quantization may be transformed back to the original form using an inverse DCT synthesis process which is modified in accordance with the above teachings.

It should also be understood that the term speech in connection with inputs to the above-described coders/decoders (codecs) is merely representative of the broader class of audio signals. Thus the term should be understood to include music and other high quality audio signals, as well as speech signals. The term audio, likewise, is, of course, understood to include speech.

I claim:

1. An apparatus comprising:
a subband synthesis filter for processing coded subband signals associated with the output of one subband of a subband analysis filter bank, said coded subband signals of said subband having been coded by a corresponding subband coder, said corresponding subband coder having one or more characteristic parameters associated therewith, said subband synthesis filter having a transfer function based on the transfer function of said subband analysis filter bank and on at least one of said characteristic parameters of said corresponding subband coder; and
means for combining the output of said subband synthesis filter with the output of at least one other subband synthesis filter.

2. The apparatus in accordance with claim 1, wherein said subband coder comprises a quantizer for quantizing said subband signals into a plurality of predetermined levels.

3. The apparatus in accordance with claim 2, wherein said subband analysis filter bank is applied to an input signal, separating said input signal into a plurality of said subband signals; and wherein the output of said subband synthesis filter is combined with the outputs of at least one other subband synthesis filter, each of said other subband synthesis filters having been applied to coded subband signals associated with the output of other subbands of said subband analysis filter bank, thereby producing a replica signal representative of said input signal.

4. The apparatus in accordance with claim 3, wherein said input signal comprises an audio signal.

5. The apparatus in accordance with claim 3, wherein said input signal comprises a still image signal.

6. The apparatus in accordance with claim 3, wherein said input signal comprises a video signal.

7. The apparatus in accordance with claim 3, wherein said transfer function reduces the portion of the error between said replica signal and said input signal which is correlated to said input signal, irrespective of the portion of said error which is uncorrelated to said input signal.

8. The apparatus in accordance with claim 7, wherein said quantizer comprises a Lloyd-Max quantizer.

9. The apparatus in accordance with claim 8, wherein said transfer function reduces said correlated portion of said error substantially to zero.

10. The apparatus in accordance with claim 9, wherein said transfer function G is given by $$G=(1/\alpha)T,$$

where T is a perfect reconstruction filter section for said subband analysis filter bank corresponding to said subband, and $\alpha$ is the gain factor of the gain plus additive noise linear model for said Lloyd-Max quantizer.

11. The apparatus in accordance with claim 8, wherein said transfer function G is given by $$G=(1/\alpha)T,$$

where T is a quadrature mirror filter section for said subband analysis filter bank corresponding to said subband, and $\alpha$ is the gain factor of the gain plus additive noise linear model for said Lloyd-Max quantizer.

12. A method for decoding a coded input signal wherein said coded input signal comprises a plurality of coded subband signals, each of said coded subband signals associated with the output of one subband of a subband analysis filter bank, said subband analysis filter bank having been applied to an input signal to separate said input signal into a plurality of subband signals, each of said coded subband signals having been coded by a corresponding subband coder, each of said corresponding subband coders having one or more characteristic parameters associated therewith, the method comprising the steps of
filtering each of said coded subband signals by a corresponding subband synthesis filter, each of said subband synthesis filters having a transfer function based on the transfer function of said subband analysis filter bank and on at least one of said characteristic parameters of said corresponding subband coder; and
combining the outputs of said subband synthesis filters to produce a replica signal representative of said input signal.

13. The method in accordance with claim 12, wherein said subband coders comprise quantizers for quantizing said subband signals into a plurality of predetermined levels.

14. The method in accordance with claim 13, wherein said transfer function reduces the portion of the error between said replica signal and said input signal which is correlated to said input signal, irrespective of the portion of said error which is uncorrelated to said input signal.

15. The method in accordance with claim 14, wherein said quantizer comprises a Lloyd-Max quantizer.

16. The method in accordance with claim 15, wherein said transfer function reduces said correlated portion of said error substantially to zero.

17. The method in accordance with claim 16, wherein said transfer function G is given by $$G=(1/\alpha)T,$$

where T is a perfect reconstruction filter section for said subband analysis filter bank corresponding to said subband, and $\alpha$ is the gain factor of the gain plus additive noise linear model for said Lloyd-Max quantizer.

18. The method in accordance with claim 17, further comprising the step of applying a noise removal scheme to said replica signal to reduce said uncorrelated portion of said error.

19. The method in accordance with claim 15, wherein said transfer function G is given by $$G=(1/\alpha)T,$$

where T is a quadrature mirror filter section for said subband analysis filter bank corresponding to said subband, and $\alpha$ is the gain factor of the gain plus additive noise linear model for said Lloyd-Max quantizer.

20. The method in accordance with claim 19, further comprising the step of applying a noise removal scheme to said replica signal to reduce said uncorrelated portion of said error.

21. The method in accordance with claim 12, wherein said input signal comprises an audio signal.

22. The method in accordance with claim 12, wherein said input signal comprises a still image signal.

23. The method in accordance with claim 12, wherein said input signal comprises a video signal.

* * * * *